United States Patent
Yang

(10) Patent No.: US 9,970,793 B2
(45) Date of Patent: May 15, 2018

(54) SELF-ROTATING FLOWMETER HAVING A ROTATING MECHANISM INCLUDING A HOLLOW SHAFT AND A DISK HAVING INTERNAL FLOW PASSAGES

(71) Applicant: Zhou Yang, Oak Ridge, NC (US)

(72) Inventor: Zhou Yang, Oak Ridge, NC (US)

(73) Assignee: Shanghai Universoon Autoparts Co., Ltd., Shanghai (CN)

(*) Notice: Subject to any disclaimer, the term of this patent is extended or adjusted under 35 U.S.C. 154(b) by 28 days.

(21) Appl. No.: 15/183,870

(22) Filed: Jun. 16, 2016

(65) Prior Publication Data
US 2016/0290839 A1 Oct. 6, 2016

Related U.S. Application Data

(63) Continuation-in-part of application No. PCT/CN2014/001002, filed on Nov. 13, 2014.

(30) Foreign Application Priority Data

Dec. 17, 2013 (CN) .......................... 2013 1 0697539

(51) Int. Cl.
| | | |
|---|---|---|
| *G01F 1/11* | (2006.01) | |
| *G01F 1/115* | (2006.01) | |
| *G01F 1/05* | (2006.01) | |
| *G01F 1/28* | (2006.01) | |

(52) U.S. Cl.
CPC ................ *G01F 1/115* (2013.01); *G01F 1/05* (2013.01); *G01F 1/28* (2013.01)

(58) Field of Classification Search
None
See application file for complete search history.

(56) References Cited

U.S. PATENT DOCUMENTS

| 211,572 A | 1/1879 | Hinden | |
|---|---|---|---|
| 3,143,881 A * | 8/1964 | Booth | G01F 1/22 73/861.56 |
| 3,863,806 A * | 2/1975 | Risser, Jr. | G01F 1/10 73/861.79 |

(Continued)

FOREIGN PATENT DOCUMENTS

| CN | 85103658 A | 12/1986 |
|---|---|---|
| CN | 1196477 A | 10/1998 |

(Continued)

OTHER PUBLICATIONS

PCT/CN2014/001002 Examination Report.

*Primary Examiner* — Harshad R Patel
(74) *Attorney, Agent, or Firm* — RuyakCherian LLP

(57) ABSTRACT

A self-rotating flow meter includes a housing, a rotating mechanism and a sensor. The rotating mechanism is disposed in a chamber of the housing between an inlet port and an outlet port. The sensor is disposed in the housing and near the rotating mechanism. The rotation mechanism contains inflow and outflow passages in a rotating shaft and a rotating disk respectively. The inlet flow passage has a centerline that is coincident with or parallel to the centerline of the rotating shaft. The centerline of any outlet flow passage in the rotating disk and the centerline of the rotating shaft are in two different planes and have a distance between them.

1 Claim, 5 Drawing Sheets

(56) References Cited

U.S. PATENT DOCUMENTS

| | | | | |
|---|---|---|---|---|
| 3,913,399 A * | 10/1975 | Sheeks | G01F 1/10 | 73/861.86 |
| 4,250,745 A * | 2/1981 | Blatter | G01F 1/28 | 73/861.74 |
| 4,333,355 A * | 6/1982 | Dacus | G01F 1/10 | 73/861.91 |
| 4,773,275 A * | 9/1988 | Kalinoski | G01F 1/584 | 73/861.12 |
| 5,226,329 A * | 7/1993 | Peters | G01F 1/10 | 73/861.79 |
| 5,744,706 A * | 4/1998 | Siraky | G01D 11/245 | 73/431 |
| 6,012,339 A * | 1/2000 | Genack | G01F 1/075 | 73/861.77 |
| 6,053,055 A * | 4/2000 | Nelson | F16K 3/085 | 73/861.52 |
| 2011/0052388 A1* | 3/2011 | Mavrosakis | F01D 25/162 | 73/114.81 |
| 2012/0186361 A1* | 7/2012 | Schmid | G01F 1/82 | 73/861 |

FOREIGN PATENT DOCUMENTS

| | | |
|---|---|---|
| CN | 2369216 Y | 3/2000 |
| CN | 2432551 Y | 5/2001 |
| CN | 1419108 A | 5/2003 |
| CN | 1587917 A | 3/2005 |
| CN | 2735309 Y | 10/2005 |
| CN | 201229191 Y | 4/2009 |
| CN | 101514912 A | 8/2009 |
| CN | 201463935 U | 5/2010 |
| CN | 102169350 A | 8/2011 |
| CN | 202281631 U | 6/2012 |
| CN | 102636222 A | 8/2012 |
| CN | 202403746 U | 8/2012 |
| CN | 102753945 A | 10/2012 |
| CN | 203191003 U | 9/2013 |
| CN | 203489922 U | 3/2014 |

* cited by examiner

SELF-ROTATING FLOWMETER HAVING A ROTATING MECHANISM INCLUDING A HOLLOW SHAFT AND A DISK HAVING INTERNAL FLOW PASSAGES

CROSS-REFERENCE TO RELATED APPLICATIONS

The present application is a continuation-in-part of International Patent Application PCT/CN2014/001002 filed Nov. 13, 2014, and claims priority of Chinese Patent Application No. 201310697539.2 filed Dec. 17, 2013, both of which applications are incorporated herein in their entireties by reference.

FIELD OF THE INVENTION

The present application relates to the field of physics, especially in the field of flow measurement, in particular a self-rotating flow meter.

BACKGROUND OF THE INVENTION

In the prior art, turbine flow meters, positive displacement flow meters and Coriolis mass flow meters are the top three flow meter products with best repeatability and accuracy. Still there are shortcomings with those flow meters, such as complex structures, bulky bodies, high prices, poor durability and reliability, narrow measurement range, and uneasy installation and adjustment.

SUMMARY OF THE INVENTION

The present invention is to provide a self-rotating flow meter to solve the technical problems of turbine flow meters, positive displacement flow meters and Coriolis mass flow meters in the prior art, such as complex structures, bulky bodies, high prices, poor durability and reliability, narrow measurement range, and uneasy installation and adjustment.

According to one aspect of the present invention, a self-rotating flow meter comprises a housing, a rotating mechanism and a sensor, the housing comprising an inlet port, an outlet port and a chamber between the inlet port and the outlet port, the rotating mechanism being disposed in the chamber and having a rotating shaft as well as a rotating disk that is attached to the rotating shaft, the sensor being disposed in the housing and near the rotating mechanism, wherein the rotating mechanism comprises internal flow passages, the internal flow passages comprising an inflow passage and at least one outflow passage, the inflow passage being located inside the rotating shaft and having a centerline that is coincident with or parallel to the centerline of the rotating shaft; the at least one outflow passage being disposed in the rotating disk, the centerline of any one of the outflow passage(s) in the rotating disk and the centerline of the rotating shaft being in two different planes and having a distance between them, the rotating mechanism being rotated by a measured fluid out of the outflow passage(s) in the rotating disk, and the sensor measuring the rotational speed of the rotating mechanism.

Further, the fluid measured out of the outflow passage in the rotating disk is determined by the following parameters:
 a. number of the outlet flow passage(s),
 b. flow area of each of the outlet flow passage(s),
 c. the distance between the outlet flow passage centerline and the rotating shaft centerline,
 d. the rotational speed of the rotating mechanism, and
 e. resistance to the rotation of the rotating mechanism.

Further, the internal flow passages further comprises an intermediate flow passage or a transition zone, the intermediate flow passage or transition zone connecting the inflow passage and the outflow passage(s), the inflow passage flow area being larger than all of the outflow passage flow area combined.

Further, the centerline of any one of the outflow passage(s) in the rotating disk and the centerline of the rotating shaft are perpendicular to or almost perpendicular to each other.

Further, both radial and axial positioning mechanisms are provided between the rotation mechanism and the chamber of the housing.

Further, the radial positioning mechanism comprises a bearing mechanism.

Further, the axial positioning mechanism comprises a clip ring, or a washer, or a plate, or a ball, or a spring-piston system, or a combination of two or more of the above mechanisms.

Further, the axial positioning mechanism comprises a ball and a positioning plate, said positioning plate is installed on the housing, and there is at least one flow passage through the positioning plate, the ball is between the rotating mechanism and the positioning plate, and the center of the ball lies on the centerline of the rotating shaft.

Further, the spring-piston system is installed on the housing, said spring-piston system tends to move the rotating mechanism backward to close the internal flow passages in the rotating mechanism.

The rotating mechanism moves axially in the chamber of the housing, when the rotating mechanism being moved forward by a forward flow of the measured fluid to open the internal flow passages in the rotating mechanism, the forward flow flows out of the outlet passages in the rotating disk to create the rotation of the rotating mechanism; when the rotating mechanism being moved backward by a backward flow of the measured fluid to close the internal flow passages in the rotating mechanism, the backward flow is blocked, and the rotation of the rotating mechanism is stopped.

The housing comprises connecting and sealing members.

The sensor comprises a magnetic sensor, and said rotating mechanism is equipped with at least one magnet.

The self-rotating flow meter further comprising a check valve mechanism, wherein the check valve mechanism prevents a backward flow of the measured fluid through the internal flow passages in the rotating mechanism.

The check valve mechanism comprises a flow passage in the housing and a connecting flow passage in the rotating mechanism, the two flow passages in the housing and in the rotating mechanism are connected when there is a forward flow of the measured fluid, and the two flow passages in the housing and in the rotating mechanism are disconnected when there is a backward flow of the measured fluid.

DETAILED DESCRIPTION OF THE EMBODIMENTS

First Embodiment

Figure 1:
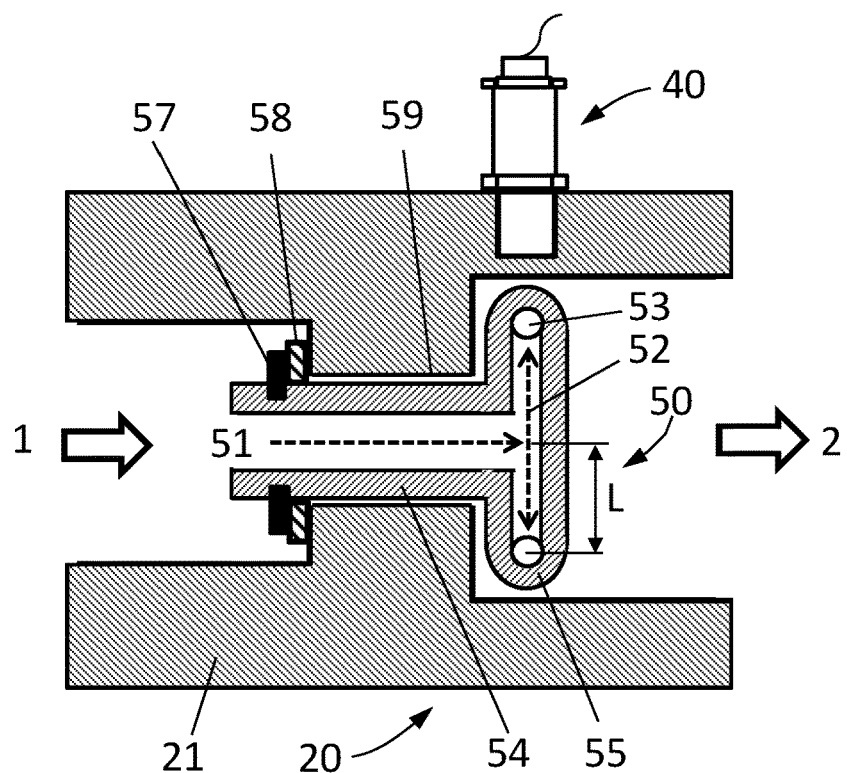
FIG. 1 is a schematic view showing a first embodiment of a self-rotating flow meter according to the present invention.
Figure 2:
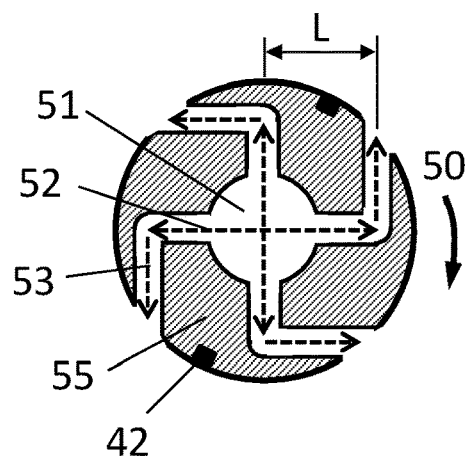
FIG. 2 is a radial cross section view (through the rotating disk) of the rotating mechanism according to the first embodiment showing in FIG. 1.

FIGS. 1 and 2 are used to describe the first embodiment of the present invention. As shown in FIGS. 1 and 2, the self-rotating flow meter 20 of the present invention includes a housing 21, a rotating mechanism 50 and a sensor 40.

The housing 21 includes an inflow port 1, an outflow port 2 and a chamber between the two ports. There is a through-hole 59 in the chamber. Of course, the flow meter 20 may be formed of a plurality of housings, including connecting and sealing members that are connected with fluid conduits (used to transfer a fluid to be measured).

The rotating mechanism 50 includes a rotor (a rotating shaft) 54 mounted within the through-hole 59. The rotor 54 is attached with a rotating disk 55 (FIG. 2 shows a radial cross section of the rotating disk). The rotating mechanism 50 contains internal flow passages, including an inlet flow passage 51 in the rotating shaft 54 and four outlet flow passages 53 in the rotating disk 55 (at least one outlet flow passage is needed in real application). Intermediate flow passages or a transition zone 52 may be needed to connect the inlet flow and outlet flow passages 51 and 53. The centerline of the inlet flow passage 51 coincides with or parallel to the rotational axis of the rotating mechanism (the centerline of the rotating shaft). The centerline of any one of the outlet flow passages 53 and the centerline of the inlet flow passage 51 (here is the same as the centerline of the rotating shaft) are in two different planes and have a distance L and an angle from 0 to 180° between them. Preferably, the centerlines of any one of the outlet flow passage 53 and the rotating shaft are perpendicular or nearly perpendicular to each other and not in the same plane. Fluid to be measured flows into the inlet flow passage 51, through the intermediate flow passages or transition zone 52, and then flows out of the outlet flow passages 53. The flow area of the inlet flow passage is greater than the flow area of all of the outlet flow passages combined. The measured fluid flows through the internal flow passages in the rotating mechanism 50 and forces it to rotate.

Both radial and axial positioning mechanisms are provided between the rotation mechanism 50 and the chamber of the housing 21. The rotating shaft (the rotor) 54 of the rotating mechanism 50 forms a sliding bearing type connection with the through-hole 59. The axial positioning mechanism is provided by connecting members 57 (retaining ring or collar) and 58 (spacer or washer) to allow rotation of the rotating mechanism 50 in the housing chamber, but to restrict its axial movement in the housing chamber. Of course, the rotating mechanism 50 may be an assembly composed of a plurality of parts, and may be connected or positioned by other ways, such as using a rolling bearing connection.

The sensor 40 measures the rotational speed of the rotating mechanism, and its role is similar to the well-known turbine flow meter sensors, for example, a magnetic sensors. The rotating mechanism 50 includes at least one magnet 42 (FIG. 2 shows two magnets). The flow rate of the measured fluid through the flow passages is directly related to the rotational speed of the rotating mechanism 50 measured by the sensor 40. The rotational speed can be converted into flow rate by different methods and devices. And the measured flow rate is also related to the following parameters: number (how many) of the outlet flow passages 53, flow area of each of the outlet flow passages, the distance L between the centerline of the inlet flow passage 51 (here is the same as the centerline of the rotating shaft 54) and the centerline of the outlet flow passage 53, the resistance to the rotation of the rotating mechanism 50 and the like.

Second Embodiment

Figure 3:
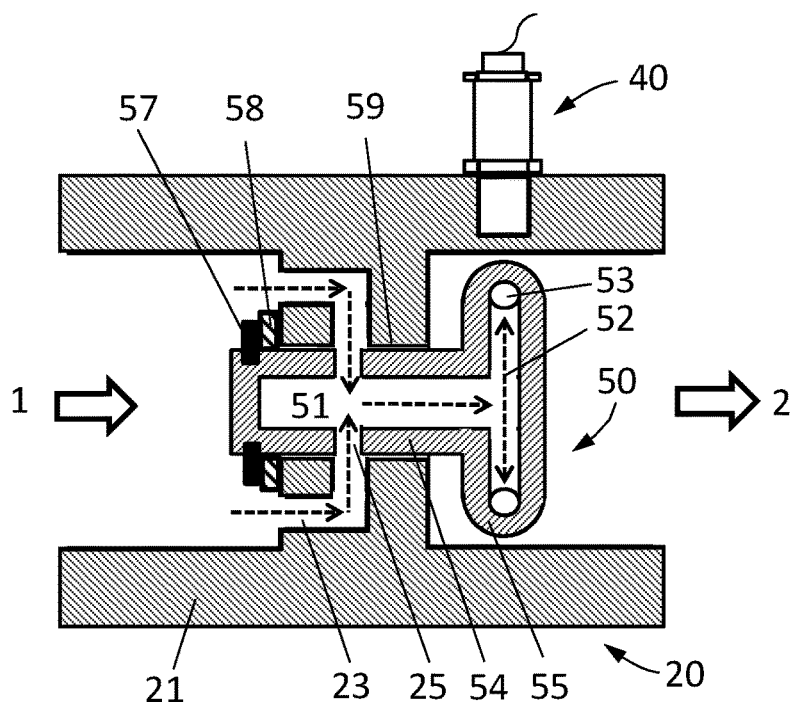
FIG. 3 is a schematic view showing a second embodiment of a self-rotating flow meter when the measured flow is going forward according to the present invention.
Figure 4:
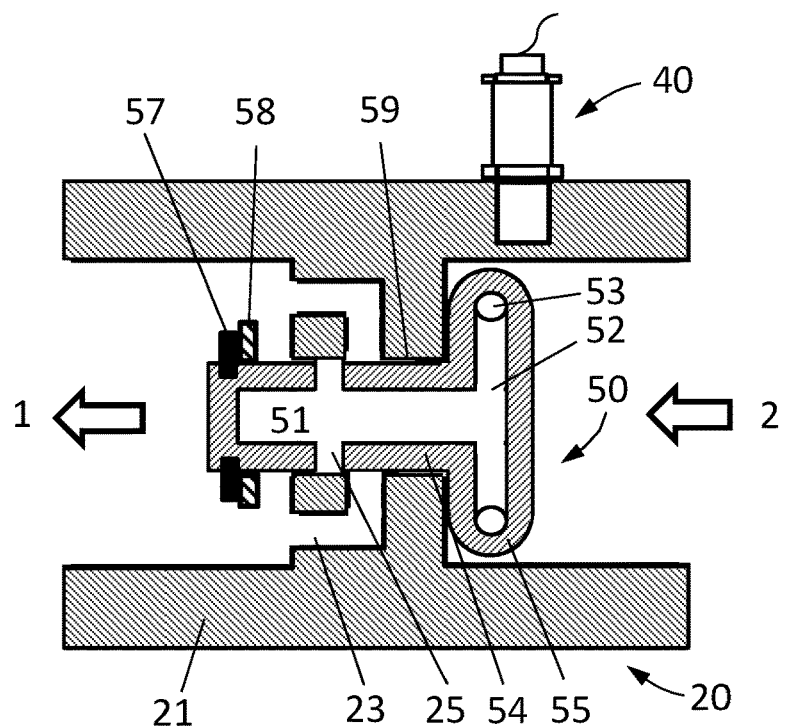
FIG. 4 is a schematic view showing the second embodiment of a self-rotating flow meter when the measured flow is going backward according to the present invention.

FIGS. 3 and 4 are used to describe the second embodiment of the present invention. The difference between this embodiment and the first embodiment is the check valve mechanism. As shown in FIGS. 3 and 4, the check valve mechanism includes a flow passage 23, such as a drill or a groove in the housing 21 (could be many drills), and a connecting flow passage 25, such as a drill or a groove in the rotating mechanism 50, for example, in the rotating shaft 54 (could be many drills). When there is a forward flow of the measured fluid, from 1 to 2 as shown in FIG. 3, the rotating mechanism 50 is pressed forward to the right and the flow passages 23 and 25 in the housing 21 and in the rotating mechanism 50 are connected to each other to allow a forward flow out of the rotating disk 55, which creates the rotation of the rotating mechanism 50. However, when there is a backward flow of the measured fluid, from 2 to 1 as shown in FIG. 4, the rotating mechanism 50 is pressed backward to the left and the flow passages 23 and 25 in the housing 21 and in the rotating mechanism 50 are disconnected from each other to prevent any of the backward flow or reverse flow, which stops the rotation of the rotating mechanism 50. Therefore, the check valve mechanism is used to prevent backward flow or reverse flow of the measured fluid (note that very small and slow leakage of backward flow is allowed and may be beneficial to prevent high pressure due to heating of fluid in the downstream of the flow meter).

Third Embodiment

Figure 5:
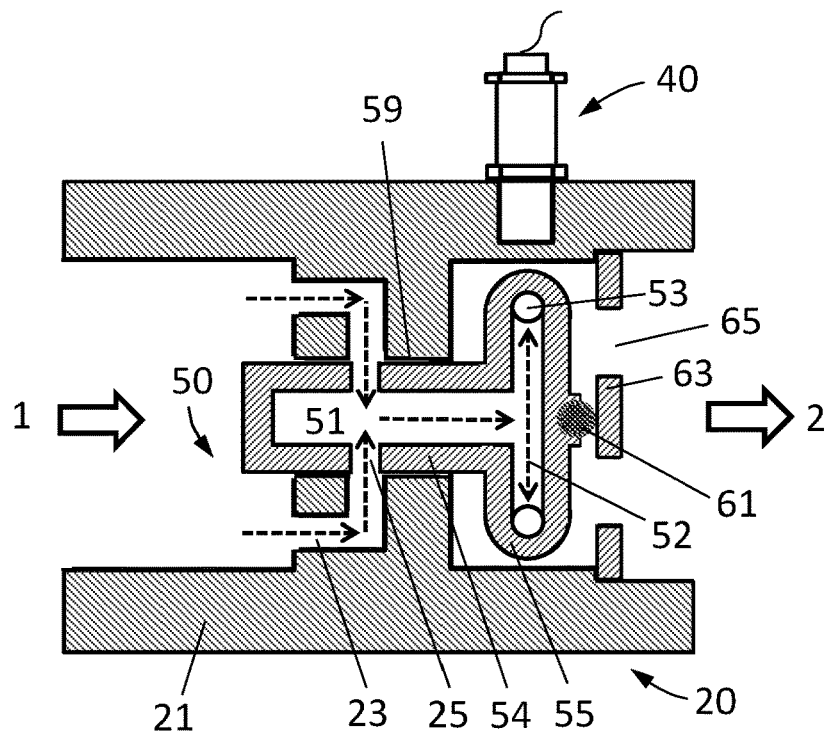
FIG. 5 is a schematic view showing a third embodiment of a self-rotating flow meter when the measured flow is going forward according to the present invention.
Figure 6:
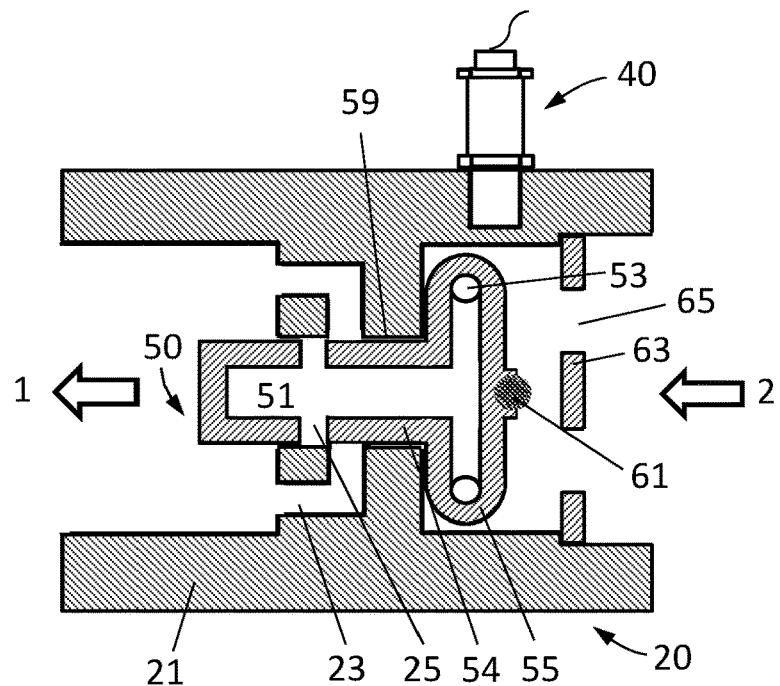
FIG. 6 is a schematic view showing the third embodiment of a self-rotating flow meter when the measured flow is going backward according to the present invention.

FIGS. 5 and 6 are used to describe the third embodiment of the present invention. The difference between this embodiment and the second embodiment is the axial positioning mechanism of the rotating mechanism. As shown in FIGS. 5 and 6, the axial positioning mechanism includes a ball 61 and a positioning plate 63. The positioning plate 63 is installed on the housing 21, and there is at least one flow passage 65 through the positioning plate (two are shown here), the ball 61 is between the rotating mechanism 50 and the positioning plate 63. The ball 61 shown here is installed on the rotating mechanism 50 and its center lies on the centerline of the rotating shaft 54 to minimize any friction torque.

When there is a forward flow of the measured fluid, from 1 to 2 as shown in FIG. 5, the rotating mechanism 50 is pressed forward to the right where the ball 61 contacts the positioning plate 63 and the flow passages 23 and 25 in the housing 21 and in the rotating mechanism 50 are connected to each other to allow a forward flow out of the rotating disk 55, which creates the rotation of the rotating mechanism 50. However, when there is a backward flow of the measured fluid, from 2 to 1 as shown in FIG. 6, the rotating mechanism 50 is pressed backward to the left and the flow passages 23 and 25 in the housing 21 and in the rotating mechanism 50 are disconnected from each other to prevent any of the backward flow or reverse flow, which stops the rotation of the rotating mechanism 50.

Fourth Embodiment

Figure 7:
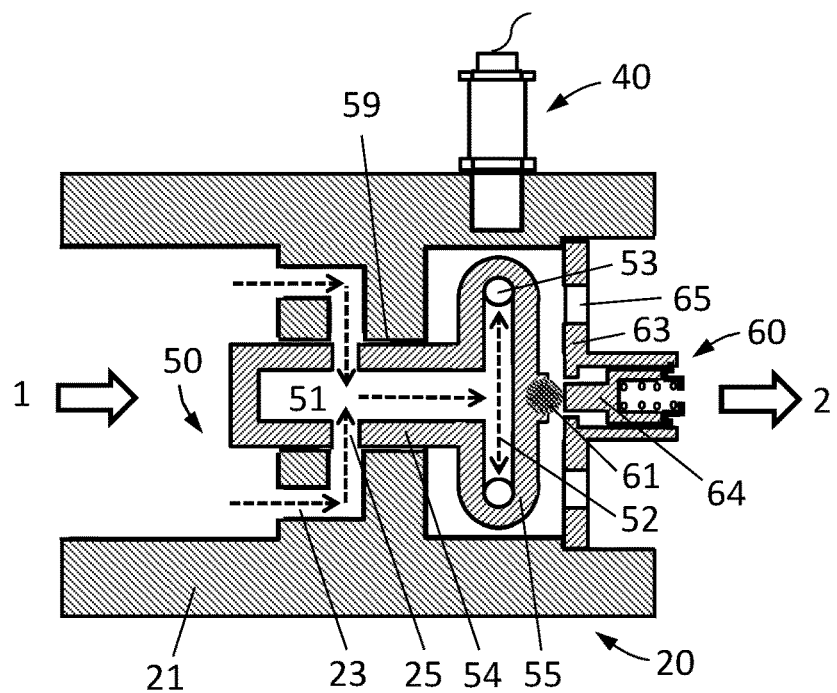
FIG. 7 is a schematic view showing a fourth embodiment of a self-rotating flow meter when the measured flow is going forward according to the present invention.
Figure 8:
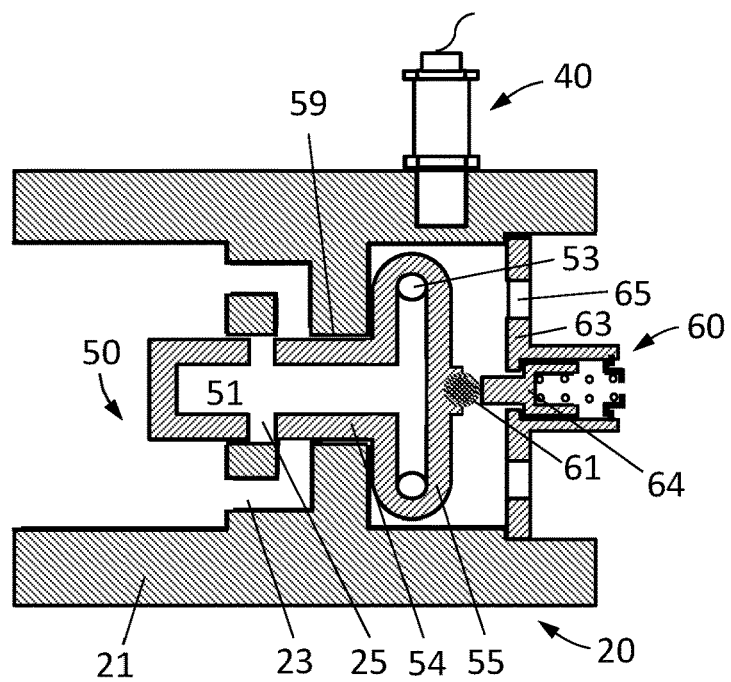
FIG. 8 is a schematic view showing the fourth embodiment of a self-rotating flow meter when there is no fluid flow according to the present invention.

FIGS. 7 and 8 are used to describe the fourth embodiment of the present invention. The difference between this embodiment and the third embodiment is the axial positioning mechanism of the rotating mechanism. As shown in FIGS. 7 and 8, the axial positioning mechanism includes a spring-piston system 60 installed in the positioning plate 63. The spring-piston system 60 tends to move the rotating mechanism 50 backward (to the left) to close the internal flow passages in the rotating mechanism (FIG. 8) when there is not fluid flow.

When there is a forward flow of the measured fluid, from 1 to 2 as shown in FIG. 7, the rotating mechanism 50 is pressed forward to the right where the ball 61 moves the piston 64 to its seat (overcoming the spring preload) and the flow passages 23 in the housing 21 and 25 and in the rotating mechanism 50 are connected to each other to allow a forward flow out of the rotating disk 55, which creates the rotation of the rotating mechanism 50. However, when there is no flow (FIG. 8) or a backward flow of the measured fluid, the rotating mechanism 50 is pressed backward to the left by the spring-piston system 60 and the flow passages 23 and 25 in the housing 21 and in the rotating mechanism 50 are disconnected from each other to prevent any of the backward flow or reverse flow, which stops the rotation of the rotating mechanism 50.

While the above description contains many specific embodiments, it should not be regarded as limitations on the scope of the present invention, but rather as specific exemplifications. Many other variations are likely to be derived from the specific embodiments. For example, the meter shown here can be made of different materials, such as metals, plastics and rubber, and other materials according to application requirements.

In addition, the sensor 40 shown here can be different varieties, the data collecting and processing methods and tools of the sensor can also vary. Other types of sensors can also be used, such as temperature sensors, pressure sensors, etc., to obtain the measured fluid temperature, pressure and density to derive the flow measurement.

Figure 9:
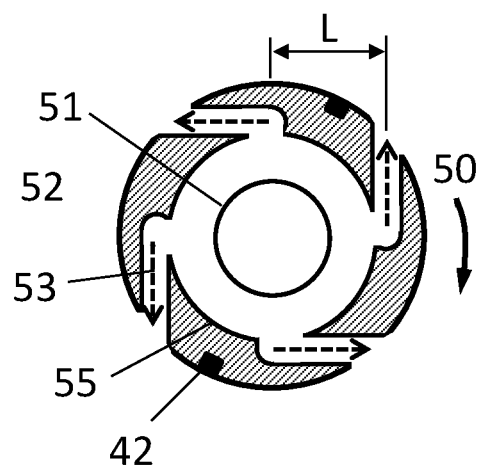
FIG. 9 is another radial cross section view (through the rotating disk) of the rotating mechanism of a self-rotating flow meter according to the present invention.

Also, the check valve mechanism and bearing mechanism could be different. And the intermediate flow passage or transition zone could be different, as shown in FIG. 9.

Therefore, the scope of the present invention should not be defined by the above mentioned specific example, but by the appended claims.

What is claimed is:

1. A self-rotating flow meter comprising
a housing,
a rotating mechanism and
a sensor,
the housing comprising
an inlet port,
an outlet port and
a chamber between the inlet port and the outlet port,
the rotating mechanism being disposed in the chamber and having
a rotating shaft as well as
a rotating disk that is attached to the rotating shaft,
the sensor being disposed in the housing and near the rotating mechanism, wherein the rotating mechanism comprises internal flow passages, the internal flow passages comprising an inflow passage and at least one outflow passage, the inflow passage being located inside the rotating shaft and having a centerline that is coincident with or parallel to the centerline of the rotating shaft; the at least one outflow passage being disposed in the rotating disk, the centerline of any one of the outflow passage(s) in the rotating disk and the centerline of the rotating shaft being in two different planes and having a distance between them, the rotating mechanism being rotated by a measured fluid out of the at least one outflow passage in the rotating disk, and the sensor measuring the rotational speed of the rotating mechanism,
wherein said rotating mechanism moves axially in the chamber of the housing, when the rotating mechanism being moved forward by a forward flow of the measured fluid to open the internal flow passages in the rotating mechanism, the forward flow flows out of the outlet passages in the rotating disk to create the rotation of the rotating mechanism; when the rotating mechanism being moved backward by a backward flow of the measured fluid to close the internal flow passages in the rotating mechanism, the backward flow is blocked, and the rotation of the rotating mechanism is stopped.

* * * * *